United States Patent [19]
DeMarco, Jr.

[11] Patent Number: 5,553,176
[45] Date of Patent: Sep. 3, 1996

[54] SINGLE IN-LINE FIBER-OPTIC ROTARY JOINT

[75] Inventor: James S. DeMarco, Jr., Waterford, Conn.

[73] Assignee: The United States of America as represented by the Secretary of the Navy, Washington, D.C.

[21] Appl. No.: 502,406

[22] Filed: Jul. 14, 1995

[51] Int. Cl.$^6$ .................................................. G02B 6/26
[52] U.S. Cl. ......................................... 385/26; 385/25
[58] Field of Search ...................................... 385/25, 26

[56] References Cited

U.S. PATENT DOCUMENTS

| | | | |
|---|---|---|---|
| 4,373,779 | 2/1983 | Dorsey | 385/26 |
| 4,472,052 | 7/1984 | Löfgren | 385/26 X |
| 4,529,986 | 7/1985 | d'Auria et al. | 385/25 X |
| 4,587,812 | 5/1986 | Brega | 385/26 X |

FOREIGN PATENT DOCUMENTS 63-127211  5/1988  Japan ..................................... 385/25

Primary Examiner—John D. Lee
Attorney, Agent, or Firm—Michael J. McGowan; Prithvi C. Lall; Michael F. Oglo

[57] ABSTRACT

A single in-line fiber-optic rotary joint includes inner and outer concentric body portions which are rotatable relative to each other around a common longitudinal axis. An optical to electrical converter is mounted in the inner body portion and it is operative for receiving an incoming optical signal and converting it to a corresponding electrical signal. A light source mounted along the longitudinal axis of the inner body portion receives the converted electrical signal and emits a corresponding light signal along the longitudinal axis. A light detector is positioned along the longitudinal axis in the outer body portion wherein it receives the light signal and generates a corresponding electrical signal. The electrical signal from the light detector is received by an electrical to optical converter which converts the electrical signal back to an optical signal, thus establishing a complete pathway through the rotary joint.

10 Claims, 1 Drawing Sheet

SINGLE IN-LINE FIBER-OPTIC ROTARY JOINT

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The instant invention relates to fiber optic rotary joints, and more particularly to a single in-line fiber optic rotary joint.

(2) Description of the Prior Art

Fiber optic rotary joints have heretofore been known in the art. In particular, fiber optic rotary joints have been used in oil exploration systems, seismic systems and sonar array systems as a means for passing optical and electrical power and data transmissions through two concentric or rotating bodies. As a specific example, when optical rotary joints are used in conjunction with ship-board sonar array systems, the optical rotary joints are integrated as part of the winch assembly, wherein during pay-out and retrieval of the sonar array systems, the optical rotary joints provide electrical and optical signal paths between the sonar array systems and the shipboard equipment.

Fiber optic couplings of the general type contemplated herein are described in the U.S. Patents to Hartkopf et al U.S. Pat. No. 4,680,809; Mruk U.S. Pat. No. 4,776,659; Chadha U.S. Pat. No. 5,007,697; and Snow et al No. 5,039,193 which represent the closest prior art to the subject invention of which the applicant is aware. More specifically, the patent to Hartkopf discloses a device for amplifying and coupling light paths between two optical channels LWL1 and LWL2. For channel LWL1, optical signals are converted to electrical signals and converted back to optical signals. The patent to Mruk discloses a flexible optical coupler including a light emitter unit for converting an input electrical signal to a corresponding light signal and a light detector unit for converting the light signal to a corresponding electrical output signal. The patent to Chadha concerns a fiber optic data coupler including an inlet fiber, an optical/electrical converter, an electrical/optical converter and an outlet fiber. The patent to Snow discloses a passive rotary joint for a single mode fiber optic path. The Snow joint is a mechanical joint closely aligning the ends of two optical fibers and it does not include any optical/electrical conversion devices.

SUMMARY OF THE INVENTION

The instant invention provides a fiber optic rotary joint which is operative for transmitting optical signals through two concentric rotating bodies. More specifically, the instant rotary joint provides a rotatable pathway for a single optical fiber which is smaller in size and simpler in construction than the prior art optical rotary joints. The instant rotary joint comprises inner and outer concentric body portions which are rotatable relative to each other around a common longitudinal axis. An axial bore extends between the inner and outer body portions along the longitudinal axis. An optical to electrical converter is mounted in the inner body portion and it is operative for receiving an optical signal from an input optical fiber and converting the optical signal to a corresponding electrical signal. A light source is mounted in the axial bore in the inner body portion and it is operative for receiving the converted electrical signal and directing a corresponding light signal along the axial bore toward the second body portion. A light detector is positioned along the axial bore in the outer body portion and it is operative for receiving the light signal from the light source and generating a corresponding electrical signal. The electrical signal from the light detector is then received by an electrical to optical converter which converts the electrical signal back to an optical signal and outputs the signal to an output optical fiber, thus establishing a complete pathway through the rotary joint. The rotary joint may include O-ring seals for establishing a water-tight seal between the inner and outer rotating bodies so that the rotary joint may be used in undersea applications.

Accordingly, it is an object of the instant invention to provide a rotary joint for a single fiber optic pathway.

It is another object to provide a fiber optic rotary joint which is smaller in size and simpler in construction than the prior art devices.

It is yet another object to provide a water-tight seal in a fiber optic rotary joint so that the joint may be used in undersea applications.

Other objects, features and advantages of the invention shall become apparent as the description thereof proceeds when considered in connection with the accompanying illustrative drawings.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENTS

Figure 1:
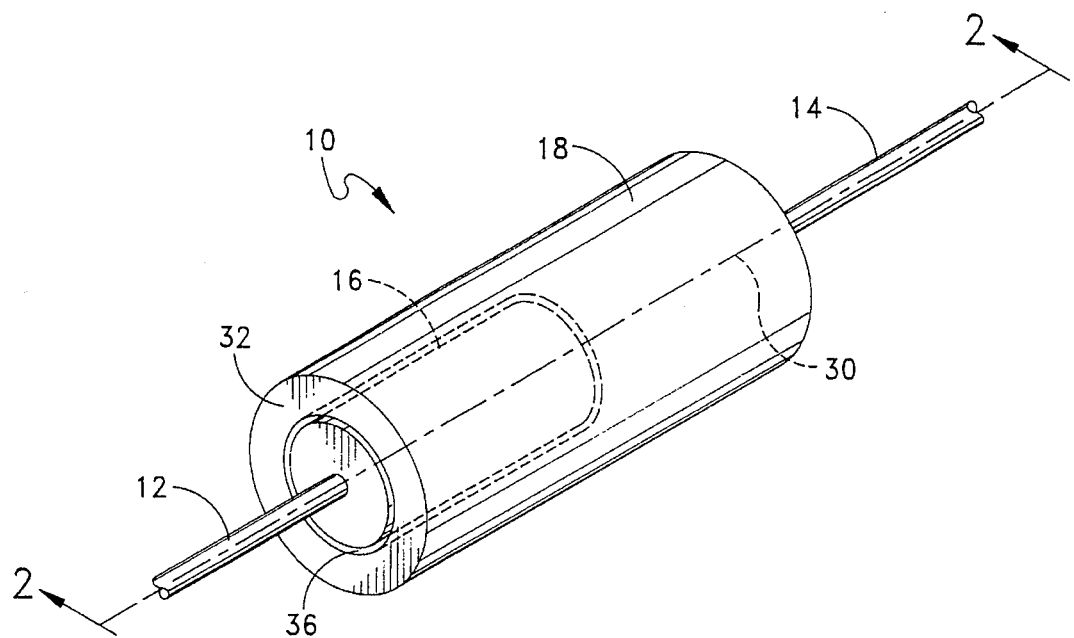
FIG. 1 is a perspective view of the single in-line fiber optic rotary joint of the instant invention.
Figure 2:
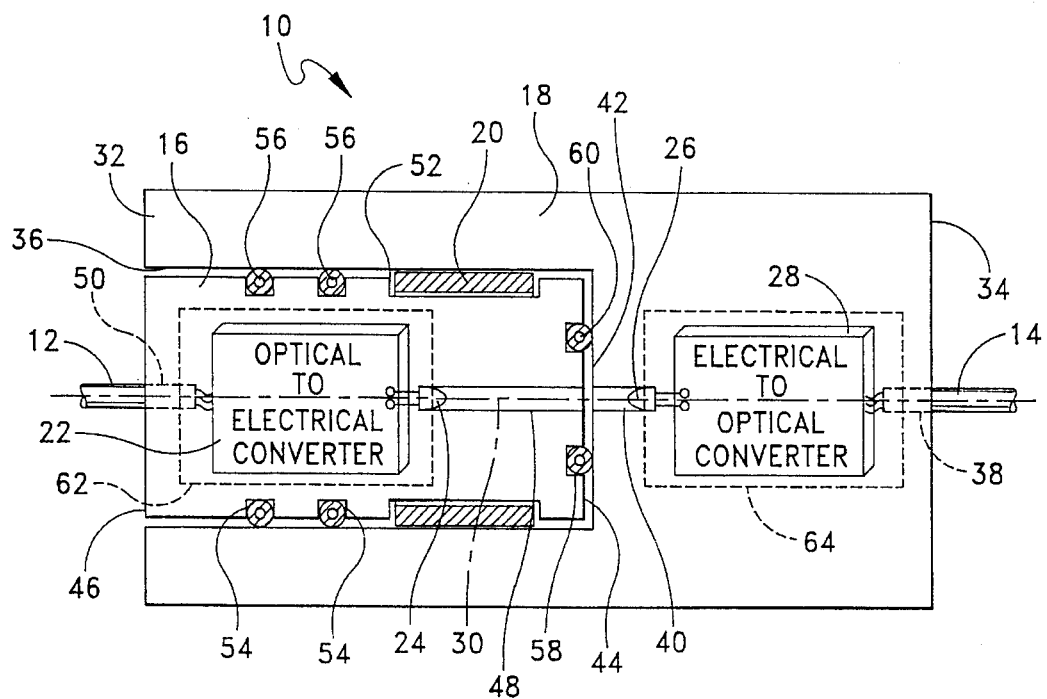
FIG. 2 is a cross-sectional view thereof taken along line 2—2 of FIG. 1.

Referring now to the drawings, the fiber optic rotary joint of the instant invention is illustrated and generally indicated at 10 in FIGS. 1 and 2. As will hereinafter be more fully described, the instant rotary joint provides a means for transmitting an optical signal from an input optical fiber 12 through two concentric rotating bodies to an output optical fiber 14. The instant fiber optic rotary joint 10 comprises inner and outer integrated concentric body portions generally indicated at 16 and 18 respectively, bearing means 20 for permitting relative rotational movement between the inner and outer body portions 16 and 18, an optical to electrical (O/E) signal converter 22, a light source 24, a light detector 26, and an electrical to optical (E/O) signal converter 28. The inner and outer concentric body portions 16 and 18 rotate around a common longitudinal axis 30. The outer body portion 18 comprises a cylindrical body having first and second ends 32 and 34 respectively, a cylindrical opening 36 at the first end 32, and a receptacle 38 at the second end 34 for securing the output optical fiber 14 therein. The outer body portion 18 further includes an axial bore 40 which extends inwardly from the bottom 42 of the cylindrical opening 36. The inner body portion 16 comprises a cylindrical body having first and second ends 44 and 46 respectively, an axial bore 48 extending inwardly from the first end 44, and a receptacle 50 at the second end 46 for securing the input optical fiber 12 therein. The inner body portion 16 further includes a wide circumferential groove 52 into which the bearing 20 is received, two narrow circumferential grooves 54 into which O-rings 56 are received, and an annular groove 58 into which O-ring 60 is received.

The first end 44 of the inner body portion 16 is slidably received into the cylindrical opening 36 in the first end 32 of the outer body portion 18 so that the axial bores 40 and 48 are in closely spaced axial alignment. In this connection, the bearing 20 is received between the circumferential groove 52 in the inner body portion 16 and the sidewall of the cylindrical opening 36 in the outer body portion 18 so as to permit relative rotational movement between the inner and outer body portions 16 and 18. In a similar manner, the O-rings 56 are received between the respective grooves 54 and the sidewall of the cylindrical opening 36 in the outer body portion 18. The O-rings 56 are operative for forming a water-tight seal between the inner and outer body portions 16 and 18 so that the rotary joint 10 may be used in undersea applications. The O-ring 60 maintains the first end 44 of the inner body portion 16 in spaced relation from the bottom 42 of the cylindrical opening 36 and effectively forms a third water-tight seal which extends around the axial bores 40 and 48.

The O/E signal converter 22 is well known in the electrical arts and it is received inside a cavity 62 in the inner body portion 16 where it is coupled to the input optical fiber 12. The O/E signal converter 22 is operative for receiving an optical signal from the input optical fiber 12 and for converting the optical signal into a corresponding electrical signal. The O/E signal converter 22 is coupled to the light source 24 which comprises a light emitting diode. The light source 24 is mounted in the axial bore 48 and it is operative for receiving the electrical signal from the O/E signal converter 22 and for emitting a corresponding light signal which is directed along the axial bores 48 and 40.

The light detector 26 comprises a conventional photodetector unit and it is mounted in the axial bore 40 in the outer body portion so as to receive the light signal from the light source 24. The light detector 26 generates a corresponding electrical signal which is in turn transmitted to the E/O signal converter 28. The E/O converter 28 is also conventional in the electrical arts and it is received inside a cavity 64 in the outer body portion 18 where it is coupled to the output optical fiber 14. The E/O signal converter 28 is operative for converting the electrical signal from the light detector 26 back into an optical signal for output through the output optical fiber 14.

In operation of the rotary joint 10, the inner and outer body portions 16 and 18 are rotatable relative to each other while an optical signal is transmitted from the input optic fiber 12, through the conversion elements, i.e., O/E converter 22, light source 24, light defector 26, and E/O converter 28, to the output optical fiber 14 without source 24 and the light detector 26 are mounted along a common axis 30, the light signal from the light source 24 is always visible to the light detector 26 no matter what rotational position the inner and outer body portions 16 and 18 have moved to. The bearing 20 provides for smooth rotational movement while the rubber O-rings 56 and 60 effectively form a water-tight seal between the inner and outer body portion 16 and 18 so that the rotary joint 10 may be used in under sea applications.

It is pointed out that both the O/E signal converter 22 and the E/O signal converter 28 require electrical power to operate. In this regard, the electrical power for the converters 22 and 28 may be supplied by either the input or output optical fibers 12 or 14, or by an electrical slip ring (not shown) as used in conventional rotary joints.

It is contemplated within the scope of the invention that both the light source 24 and the light detector 26 could be replaced with bi-directional light emitter and detector units (not shown) in order to establish a two-way optical path through the rotary joint 10.

It can therefore be seen that the instant invention provides a unique fiber optic rotary joint 10 which utilizes integrated concentric body portions 16 and 18, and a light source 24 and light detector 26 mounted on a common longitudinal axis 30 to provide an uninterrupted signal between two rotating optical fibers 12 and 14. An incoming optical signal is converted to an electrical signal which in turn is converted to a light signal. The light signal is received by a light detector 26 which converts the light signal back to an electrical signal which is in turn converted back into an optical signal for output. The instant rotary joint 10 is smaller in size, simpler in construction, and less expensive to manufacture than conventional fiber optic rotary joints. For these reasons, the in-line fiber optic rotary joint of the instant invention is believed to represent a significant advancement in the art which has substantial commercial merit.

While there is shown and described herein certain specific structure embodying the invention, it will be manifested to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fiber optic rotary joint comprising:

first and second concentric body portions having a common longitudinal axis;

bearing means for permitting relative rotational movement between said first and second body portions;

optical to electrical signal converter means in said first body portion for receiving an incoming optical signal from an input optic fiber and for converting said optical signal to a corresponding first electrical signal;

a light source positioned along said longitudinal axis in said first body portion, said light source receiving said first electrical signal and emitting a corresponding light signal along said longitudinal axis;

a light detector positioned along said longitudinal axis in said second body portion, said light detector receiving said light signal and generating a corresponding second electrical signal; and electrical to optical signal converter means in said second body portion for receiving said second electrical signal and for converting said second electrical signal to an outgoing optical signal for output to an output optic fiber.

2. The fiber optic rotary joint of claim 1, said second body portion having first and second ends, a cylindrical opening in said first end, an axial bore extending inwardly from said cylindrical opening, and means for securing said output optical fiber at said second end;

said first body portion being cylindrical in shape and having first and second ends, said first body portion further including an axial bore extending inwardly from said first end, and means for securing said input optic fiber at said second end; and said first end of said first body portion being slidably received into said cylindrical opening in said second body portion so that said axial bores are in closely spaced axial alignment, said light source and said light detector being positioned within said axial bores.

3. The fiber optic rotary joint of claim 2, said first body portion further including an outwardly facing circumferential groove, said bearing means being received in said circumferential groove.

4. The fiber optic rotary joint of claim 2, said first body portion including a circumferential groove, said fiber optic rotary joint further comprising an O-ring received in said circumferential groove so as to form a water-tight seal between said first and second body portions.

5. The fiber optic rotary joint of claim 4, said first end of said first body portion further including an annular groove surrounding said axial bore, said fiber optic rotary joint further comprising a second O-ring received in said annular groove.

6. The fiber optic rotary joint of claim 1, said light source comprising a light emitting diode.

7. A fiber optic rotary joint comprising:

inner and outer concentric body portions having a common longitudinal axis, said outer body portion having first and second ends, a cylindrical opening in said first end, an axial bore extending inwardly from said cylindrical opening, and means for securing an output optic fiber at said second end, said inner body portion being cylindrical in shape and having first and second ends, said inner body portion further including an axial bore extending inwardly from said first end, and means for securing an input optic fiber at said second end, said first end of said inner body portion being slidably received into said cylindrical opening in said outer body portion so that said axial bores are in closely spaced axial alignment;

bearing means for permitting relative rotational movement between said inner and outer body portions;

optical to electrical signal converter means in said inner body portion for receiving an incoming optical signal from said input optic fiber and for converting said incoming optical signal to a corresponding first electrical signal;

a light source positioned in said axial bore in said inner body portion, said light source receiving said first electrical signal and emitting a corresponding light signal along said axial bore;

a light detector positioned in said axial bore in said outer body portion, said light detector receiving said light signal and generating a corresponding second electrical signal; and electrical to optical converter means in said outer body portion for receiving said second electrical signal and for converting said second electrical signal to an outgoing optical signal for output to said output optic fiber.

8. The fiber optic rotary joint of claim 7, said inner body portion further including an outwardly facing circumferential groove, said bearing means being received in said circumferential groove.

9. The fiber optic rotary joint of claim 8, said inner body portion including a circumferential groove, said fiber optic rotary joint further comprising an O-ring received in said circumferential groove so as to form a water-tight seal between said inner and outer body portions.

10. The fiber optic rotary joint of claim 9, said first end of said inner body portion further including an annular groove surrounding said axial bore, said fiber optic rotary joint further comprising a second O-ring received in said annular groove.

* * * * *